United States Patent
Plesnicher

(10) Patent No.: US 10,394,932 B2
(45) Date of Patent: Aug. 27, 2019

(54) METHODS AND SYSTEMS FOR COMBINING A DIGITAL PUBLICATION SHELL WITH CUSTOM FEATURE CODE TO CREATE A DIGITAL PUBLICATION

(71) Applicant: Adobe Inc., San Jose, CA (US)

(72) Inventor: Nathan Plesnicher, Renton, WA (US)

(73) Assignee: Adobe Inc., San Jose, CA (US)

( * ) Notice: Subject to any disclaimer, the term of this patent is extended or adjusted under 35 U.S.C. 154(b) by 828 days.

(21) Appl. No.: 13/691,620

(22) Filed: Nov. 30, 2012

(65) Prior Publication Data
US 2014/0157105 A1 Jun. 5, 2014

(51) Int. Cl.
G06F 17/21 (2006.01)
G06F 17/22 (2006.01)
G06F 17/24 (2006.01)

(52) U.S. Cl.
CPC .......... *G06F 17/21* (2013.01); *G06F 17/2241* (2013.01); *G06F 17/2247* (2013.01); *G06F 17/24* (2013.01)

(58) Field of Classification Search
CPC ...... G06F 17/00; G06F 17/24; G06F 17/2247; G06F 17/21; G06F 17/2241; G06F 17/3089
USPC ........................................................ 715/234
See application file for complete search history.

(56) References Cited

U.S. PATENT DOCUMENTS

| | | | |
|---|---|---|---|
| 6,501,834 B1 * | 12/2002 | Milewski et al. | 379/93.24 |
| 7,356,537 B2 * | 4/2008 | Reynar et al. | 715/234 |
| 7,716,676 B2 * | 5/2010 | Sawicki et al. | 719/313 |
| 9,053,190 B1 * | 6/2015 | Boenau | G06F 17/2241 |
| 2006/0129973 A1 * | 6/2006 | Newcorn | G06F 17/211 |
| | | | 717/106 |
| 2006/0235855 A1 * | 10/2006 | Rousseau et al. | 707/100 |
| 2007/0038567 A1 * | 2/2007 | Allaire | G06Q 30/0239 |
| | | | 705/50 |

(Continued)

OTHER PUBLICATIONS

Dave Dickson, "Creating Digital Magazines—Update: The Digital Publishing Suite is available on Adobe Labs", Jul. 19, 2010, https://blogs.adobe.com/aemmobile/2010/07/introducing_the_adobe_digital_magazine_workflow.html, pp. 20.*

(Continued)

*Primary Examiner* — Chau T Nguyen
(74) *Attorney, Agent, or Firm* — Kilpatrick Townsend & Stockton LLP

(57) ABSTRACT

Systems and methods for creating a customized digital publication are disclosed. For example, one disclosed method for creating a customized digital publication comprises receiving, at an application builder executed by a processor, a digital publication application shell comprising an application programming interface (API), the digital publication application shell specifying standard functionality or appearance features for a digital publication application, and custom feature code specifying a custom feature based at least in part on a reference to the API of the digital publication shell, and producing the digital publication application based at least in part on the digital publication application shell and the custom feature code, wherein the digital publication application comprises at least some of the standard functionality or appearance features specified by the digital publication application shell and the custom feature specified by the custom feature code.

20 Claims, 5 Drawing Sheets

(56) References Cited

U.S. PATENT DOCUMENTS

| | | | | |
|---|---|---|---|---|
| 2007/0266309 | A1* | 11/2007 | Sellman | 715/513 |
| 2008/0082907 | A1* | 4/2008 | Sorotokin et al. | 715/210 |
| 2008/0097920 | A1* | 4/2008 | Aslani | G06Q 50/00 705/52 |
| 2011/0015995 | A1* | 1/2011 | Ellingboe | G06Q 30/02 705/14.49 |
| 2012/0110515 | A1* | 5/2012 | Abramoff | G06F 17/30994 715/854 |
| 2012/0150680 | A1* | 6/2012 | Golus | G06F 17/3089 705/26.5 |
| 2012/0236201 | A1* | 9/2012 | Larsen et al. | 348/468 |
| 2013/0007592 | A1* | 1/2013 | Dougherty et al. | 715/234 |
| 2013/0054402 | A1* | 2/2013 | Asherman | G06Q 10/101 705/26.2 |
| 2013/0124980 | A1* | 5/2013 | Hudson | G06F 17/21 715/243 |
| 2014/0214503 | A1* | 7/2014 | Chircorian | G06Q 10/10 705/14.4 |

OTHER PUBLICATIONS

Creative Bloq Staff Web design, "Digital magazine software: top 10 tools", Feb. 29, 2012, http://www.creativebloq.com/design/top-10-ways-create-digital-magazines-2122777, pp. 17.*

Brian Wood, "Create Digital Magazines Using Adobe Digital Publishing Suite and InDesign C55.5", Sep. 21, 2011, Peachpit, Publishers of technology books, eBooks, and videos for creative people, pp. 12.*

Richard Byrne, "Ebook toolkit: Easy-to-Use Applications for Creating Your Own", Feb. 28, 2012, published by School Library Journal, pp. 3.*

* cited by examiner

METHODS AND SYSTEMS FOR COMBINING A DIGITAL PUBLICATION SHELL WITH CUSTOM FEATURE CODE TO CREATE A DIGITAL PUBLICATION

FIELD

The present disclosure generally relates to computer-implemented methods and systems and, more particularly, relates to creating custom digital publications.

BACKGROUND

Digital publications, such as digital documents, magazines, books and libraries, have become prevalent with the advent of digital computing technology. Instead of purchasing hardcopy or paperback books consumers visit application stores to view, obtain and/or purchase digital publications. There are numerous software applications used by magazine publishers and software developers to develop, publish, and sell digital publications. Existing software applications used to develop digital publications provide many development and publishing features. However, such applications generally sacrifice customization in order to provide a simple development environment. For example, such applications do not provide an adequate mechanism for users to fully customize or add user-defined functionality to a digital publication or digital publication library. The users must rely on the standard features offered within the software application to build the digital publication and cannot adequately customize features. More generally existing methods and applications that allow a user to build or develop a custom digital publication are limited with respect to their intuitiveness and/or other capabilities.

SUMMARY

One exemplary embodiment involves receiving, at an application builder executed by a processor, a digital publication application shell comprising an application programming interface (API) and custom feature code specifying a custom feature based at least in part on a reference to the API of the digital publication application shell. The digital publication application shell specifying standard functionality or appearance features for a digital publication application. A digital publication application is produced based at least in part on the digital publication application shell and the custom feature code. The digital publication application comprises at least some of the standard functionality or appearance features specified by the digital publication application shell and the custom feature specified by the custom feature code

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
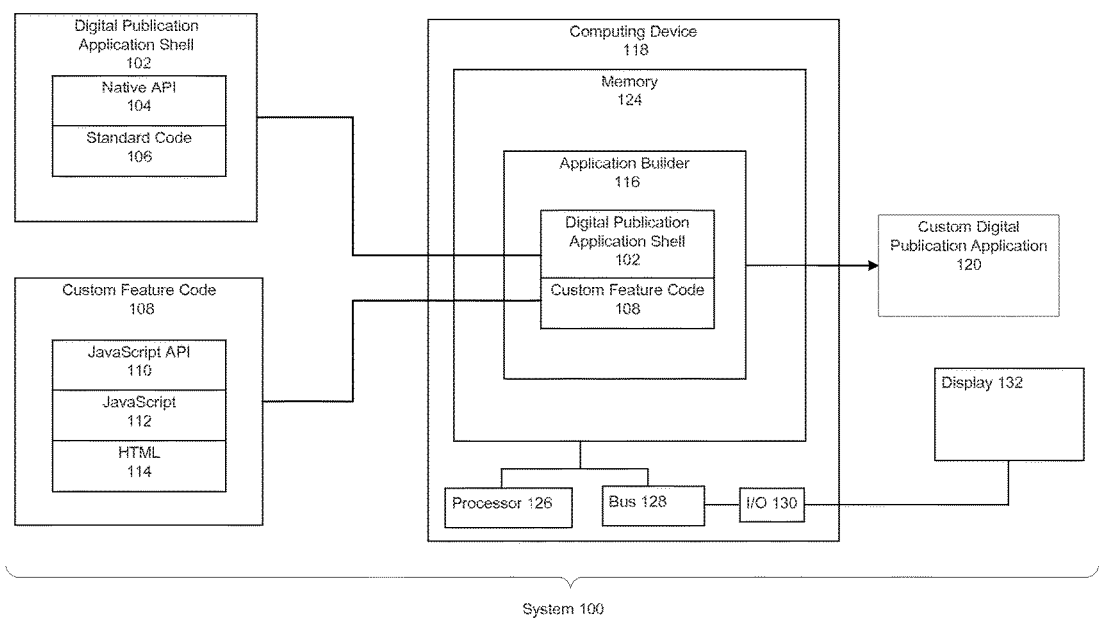
FIG. 1 is a block diagram illustrating a system for creating custom digital publications according to embodiments of this disclosure.

Example embodiments are described herein in the context of systems and methods for creating custom digital publications. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

The methods and systems disclosed herein facilitate the design of custom digital publication applications such that the custom digital publication application includes desired features. As used herein, the term "digital publication application" refers to a digital version of a document, book, magazine, publication library, and like electronic content that is capable of being viewed on computing devices. A digital publication application shell and code that specifies custom features may be used to produce a custom digital publication application. The digital publication application shell may be code, an application, and/or other electronic content that is used to define standard features of a digital publication application. The digital publication application shell may, for example, specify standard functionality and appearance features for the digital publication application.

The digital publication application shell may be configured to facilitate the addition of custom features, for example, specified via supplemental code external to the application shell. A digital publication application shell may, for example, comprise a native application programming interface (API) that facilitates extending and/or altering the standard features defined by the shell via external customized code. The native API may expose or otherwise provide commands, functions, and other interface features that can be used in connection with custom code that specifies modifications, additions, deletions, interactions and other features. Custom code can thus be created external from the shell to define custom features. However specified, custom features can be included in custom digital publication applications that are produced. In one embodiment, an application builder receives the shell and custom code and produces a digital publication application using the shell and code as inputs.

A custom digital publication application may be produced with custom features by inserting or embedding custom feature code in code provided by the digital publication application shell. For example, the application builder may use the shell and custom code to produce a digital publication application that includes enhanced functionality, appearance, and other attributes.

As used herein, the term "application builder" refers to a software application or computing device configured for generating, compiling or otherwise producing applications. The application builder may produce custom digital publication applications by, for example, using a digital publication application shell and custom feature code that specifies custom features for the digital publication application. An application builder can, in one embodiment, further be used to create the custom code that is to be used with a digital publication application shell to produce the digital publication application. The application builder can be executed at one or more development computing devices. A development computing device can be, but is not limited to, a desktop computer, a laptop computer, a server system, etc. An application builder can be implemented as a cross-platform runtime environment for different computing devices to generate, compile and produce digital publication applications. Non-limiting examples of a cross-platform runtime environment can include programs in the Adobe® Digital Publishing Suite and Adobe® InDesign CS6®.

As used herein, the term "digital publication application shell" refers to code, an application, and/or other electronic content that is used to define standard features of a digital publication application. A digital publication application shell can include one or more software modules, functions, interface features, code, and/or other electronic content. The digital publication application shell may be used within an application builder.

Custom features may be specified in custom feature code external to the digital publication application shell. Such custom feature code can be created and provided for use in producing digital publication applications in various ways. In one illustrative embodiment, custom feature code is provided as one or more software files. In one embodiment, the custom feature code references API features of the shell. For example, the custom feature code may comprise a function call that references a function exposed via a native API of a digital publication application shell. In an alternative embodiment, the custom feature code simply defines modifications, additions, deletions, interactions and other features without referencing API features of the shell.

Custom feature code may be provided in the form of declarative statements, for example, in a hyper-text markup language (HTML) or eXtensible markup language (XML) format. Custom feature code may be provided in script form, for example, using JavaScript and the like. The custom feature code may be saved in a data compression and archiving format, such as .zip, and, after the files are retrieved or obtained, the files are opened.

Custom feature code may be created in a text editor or through a development application, such as, an application that generates HTML code based on a design specified on a what-you-see-is-what-you-get (WYSIWYG) interface. An application builder, e.g., one that is used to produce a digital publication application using a shell and custom feature code, may also be configured to facilitate the creation of that custom feature code. For example, an application builder may provide an editing interface for a user to create a text document specifying the custom feature code. As another example, the application builder may provide a canvas or other design interface that allows creation on an editing canvas that is automatically converted to corresponding code. In one embodiment, design features of the application builder interpret a digital publication application shell to display standard features.

Design features of an application builder may provide information regarding how standard features defined by such a shell can be customized. For example, the interface may identify an attribute such as the background color of bookshelf graphic that can be changed and/or identify a set of candidate colors that are available to be used in customizing the background color of such a bookshelf graphic. Design features of an application builder may provide editing features according to information provided in a digital publication application shell. For example, the application builder may provide an interface that identifies features for which the shell exposes an API function for modifying the features. For example, the application builder may provide a list of features that can be modified. The interface may further facilitate receiving such customization, for example, by receiving a selection of a menu item and based on the selection creating custom code that comprises an API call to an API feature of the shell where the API call specifies the change specified by the selection. In the above example, the interface may provide a menu for selecting a background color and generate code specifying the background color based on selection of a color in the menu. In this example, the user does not need to manually enter the code to create the custom feature code. Custom feature code can thus be generated manually, be facilitated by interface and other user interface features, or may be specified in any other suitable way.

In one exemplary interface used to specify a custom feature, a user may select the feature from a menu or otherwise by clicking a mouse cursor on the custom feature or using some other similar mechanism to indicate an intention to select the feature. The interface may include an editing canvas for displaying and editing the appearance of an application. The editing canvas may display standard features based on a digital publication application shell. In such an interface, a custom feature may be added in various ways. For example, the custom feature may be manually positioned via a user selecting a type of object to be added, positioning a graphical representation of the object on the canvas, and specifying any additional attributes of the object via menus or otherwise.

The techniques for customizing electronic content disclosed herein are useful in various context. One exemplary context in which such techniques may be particularly beneficial is the context of an application that provides representations of individually-accessible content items. An electronic magazine for example may provide an interface that presents an index for accessing individual magazine articles. In this example, a custom feature of a digital magazine provides a non-standard graphical representation and associated functionality added to the standard magazine index. An example of such a non-standard graphical representation is a clock with the local time.

As another example, a collection application may provide a bookshelf interface for accessing individual books and the like. In this example, the application may provide an interface that allows a user to manage the collection and use of books and the like. An application providing a bookshelf interface may be produced based on a shell that provided standard bookshelf functions and appearance features as well as based on custom feature code. For example, the standard features may present a graphic that looks like a bookshelf and functionality for displaying selectable icons of books and the like at locations on the bookshelf. In this example, the custom code may specify that a corporate logo also be displayed and may further specify that all book icons use a particular font different from the standard font or fonts defined by the digital publication application shell. In another example, a graphical representation of a bookshelf may be customized to place or remove references to electronic content, such as a book, from the bookshelf.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings in which like numerals indicate like elements throughout the several Figures, FIG. 1 is a block diagram depicting an exemplary system for creating custom digital publications. The exemplary system may include a digital publication application shell 102, custom feature code 108, an application builder 116 executed on a computing device 118, and a digital publication application 120.

The computing device 118 can be any suitable computing system for executing a software application, such as application builder 116, suitable to produce a digital publication application 120. In one embodiment, the computing device 118 may be a single computing system. In another embodiment, the computing device 118 may be multiple computing devices. In an exemplary embodiment, the computing device 118 is implemented using a number of computing systems connected in a grid or cloud computing topology. The computing device 118 can include any suitable operating system, such as (but not limited to) Microsoft® Windows® or OS X. The computing device 118 can include application builder 116 which may include one or more software modules for generating digital publication applications. The application builder 116 can also be used to produce digital publication applications for multiple types of computing devices and multiple operating systems. Non-limiting examples of an application builder 116 can include Adobe® Digital Publishing Suite and Adobe® InDesign CS6®.

The computing device 118 includes a processor 126 that is communicatively coupled to a memory 124 and that executes computer-executable program instructions and/or accesses information stored in the memory 124. The processor 126 may comprise a microprocessor, an application-specific integrated circuit ("ASIC"), a state machine, or other processing device. The processor 126 can include any of a number of computer processing devices, including one. Such a processor can include or may be in communication with a computer-readable medium storing instructions that, when executed by the processor 126, cause the processor to perform the steps described herein.

The computing device 118 may also comprise a number of external or internal devices such as input or output devices. For example, the computing device 118 is shown with an input/output ("I/O") interface 130 and a display 132. A bus 128 can also be included in the computing device 118. The bus 128 can communicatively couple one or more components of the computing device 118. The computing device 118 can modify, access, or otherwise use application builder 116. The application builder 116 may be resident in any suitable computer-readable medium and execute on any suitable processor. In one embodiment, the application builder 116 can reside in the memory 124 at the computing device 118. In another embodiment, the application builder 116 can be accessed by the computing device 118 from a remote content provider via a data network.

In one embodiment, the application builder 116 may be used to produce, compile, or otherwise produce a digital publication application 120. The application builder 116 may use the digital publication application shell 102 and custom feature code 108 to generate the digital publication application 120. The application builder 116 may produce the digital publication application 120 designed using the digital publication application shell 102. The application builder 116 can produce the digital publication application 120 using any technique or method. In an example, within the user interface of the application builder 116, a user may select an option to generate or compile a designed digital publication application. In some embodiments, the application builder 116 and/or the user interface of application builder 116 may be used to design or create the digital publication application 120. Upon generation by the application builder 116, the digital publication application 120 may be in a form that is available to be distributed.

The application builder 116 can produce digital publication applications 120 for storage and/or transmission to one or more computing devices. Non-limiting examples of a digital publication application 120 can include books, magazines, digital publication libraries and the like. A digital publication library is an interface where multiple items of electronic content, generally books and magazines, are stored and accessible for retrieval. The digital publication applications 120 may include electronic content in multiple formats including electronic publication ("EPUB"), portable document formats ("PDF"), Hyper Text Markup Language ("HTML") formats, and proprietary formats such as Adobe® Folio®. The one or more computing device can include a desktop computer, a tablet computer, a smart phone, and the like.

The computing device 118 can be any suitable computing system for executing a software application, such as digital publication application shell 102, suitable to build or design the digital publication application. The computing device 118 can include digital publication application shell 102 which may include one or more software modules for designing and developing digital publication applications. The digital publication application shell 102 can also be used to develop digital publication applications for multiple types of computing devices and multiple operating systems. In some embodiments, the digital publication application shell 102 is a software module of the application builder 116. In this embodiment, the digital publication application shell 102 is used by or to provide a user interface of the application builder 116. For example, the digital publication application shell 102 may be a program that is run within the application builder 116 and capable of operating within the application builder 116.

An interface may be provided by the application builder 116 and/or the digital publication application shell 102 to facilitate design of a digital publication application 120. The interface may comprise standard functionality and appearance features based on the digital publication application shell 102. In some embodiments, custom features may be added to the design of a digital publication application. For example, a user to add features to the design of a digital publication application that were not provided by the digital publication application shell. User input and/or selections may specify attributes of the custom feature. An editing canvas may be provided to facilitate the design of a digital publication application.

The digital publication application shell 102 may include a native API 104 and standard code 106. The standard code 106 may be any code used to enable operation of the digital publication application shell 102. The standard code 106 may be code that defines or specifies the standard functionality and appearance features that can be used for a digital publication application. The native API 104 may be used to facilitate modifications based on custom feature code 108. For example, JavaScript API 110 calls and other references in the custom feature code 108 may reference or otherwise use functions and/or other features provided by the native API 104. The standard code 106 and the native API 104 can be written in any programming language, including, but not limited to, HTML, JavaScript, XML, and the like, and need not be written in a single language or format.

The application builder 116 may produce the digital publication application 120 with custom features based on the custom feature code 108. The custom feature code 108 may include a JavaScript API 110, JavaScript 112 and HTML 114. The HTML 114 may be code that specifies or defines the custom feature. Script code, such as JavaScript 112, may alternatively or additionally specify or otherwise define the custom features. The custom code may be configured to use or otherwise alter features provided by the digital publication application shell 102 in various ways. In this example, script code such as JavaScript API 110 may be configured to reference the native API 104 of the digital publication application shell 102 to additions, modifications, and other customizations with respect to features defined by the standard code 106. The custom feature code 108 can be written in any programming language, including, but not limited to, HTML, JavaScript, XML, and the like. The application builder 116 may be capable of interpreting API commands from the JavaScript API 110. The application builder 116 may interpret API commands to create a custom feature included within the produced digital publication application. The application builder 116 may interpret API commands to set or retrieve an application state. The application builder 116 may interpret API commands to respond to a change that originates within the native code of the digital publication application shell.

The application builder 116 may access the digital publication application shell 102 and the custom feature code 108 and use these inputs to produce the digital publication application 120. Producing the digital publication application 120 may be accomplished, for example, by embedding the custom feature code 108 within code from the digital publication application shell 102. For example, a user may select an option to embed or insert the contents of the custom feature code 108 within the digital publication application shell 102.

The digital publication application 120 may be produced by the application builder 116 by using standard functionality and appearance features specified by the digital publication application shell 102. The digital publication application 120 may also include a custom feature specified by the custom feature code 108. The custom feature code 108 may be in a format that is different than the format of the design publication application 120. The digital publication application 120 may be used in an environment, such as computing environment, in which the format of the code 108 may not be used.

The digital publication application 120 may be viewed on a computing device such as a desktop, a tablet computer, a mobile phone, and the like. In some embodiments, a computing device may include a viewer application configured to render the digital publication application 120 and/or the contents of the digital publication application 120 for display at the device. The viewer application may apply instructions to render the digital publication application 120 and/or the contents of the digital publication application 120 for display. In another embodiment, a viewer application may have scripting capabilities to execute one or more scripts embedded in the digital publication application 120 and/or the contents of the digital publication application 120.

Figure 2:
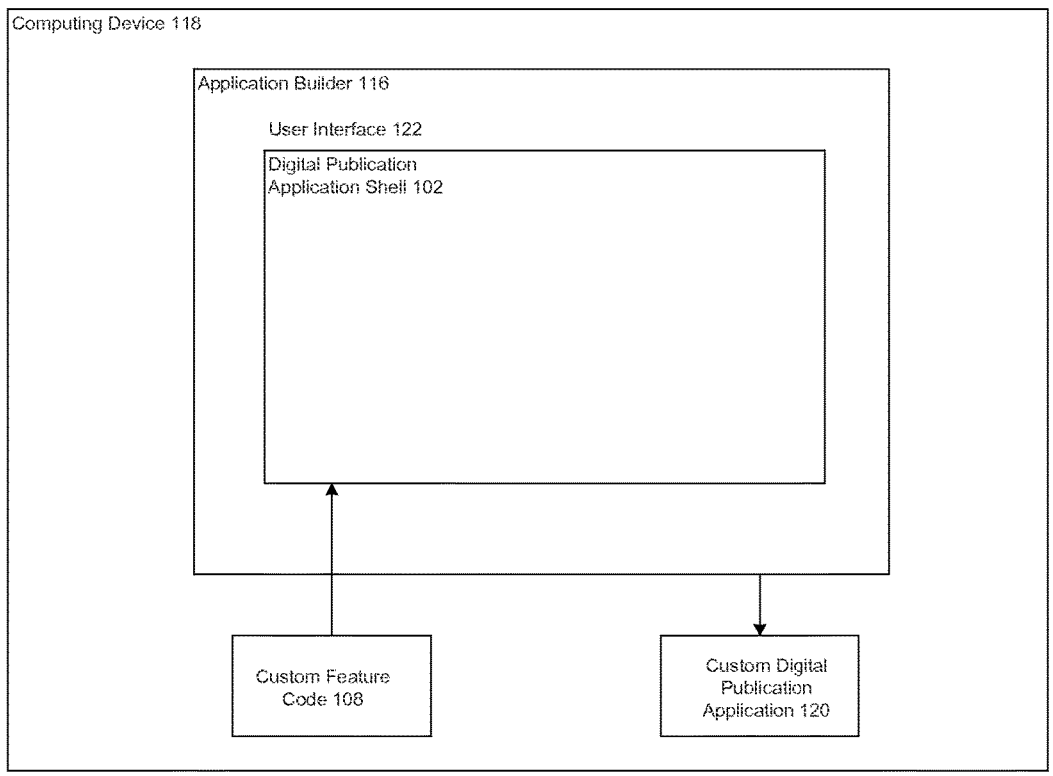
FIG. 2 is a conceptual diagram illustrating the inclusion of a digital publication application shell in an application builder.

Referring now to FIG. 2, FIG. 2 is a conceptual diagram illustrating the inclusion of a digital publication application shell 102 in an application builder 116. The application builder 116 comprises a user interface 122 for adding a custom feature to the design of a digital publication application. The user interface 122 may present features or selections (not shown) for specifying changes to a digital publication application design. For example, the user may add a feature by placing a mouse cursor on the desired feature and dragging and dropping that feature onto the desired location on the digital publication application.

The user interface 122 may facilitate the inclusion of custom features. For example, the custom feature code 108 may be inserted or embedded into the digital publication application shell 102. This may result in a graphical representation of the custom feature at the user interface 122, allowing the user to visualize and edit the customizations specified by the custom feature code 108. In some embodiments, the user interface 122 may have an editing canvas for designing the appearance of the digital publication application 120. Edits made on the user interface 122 can be used to edit the custom feature code 108, i.e., if the user moves a custom logo to a new location on a WYSIWYG display on the user interface 122, the underlying custom feature code 108 may automatically be revised to reflect the change. The user interface may also generate new custom feature code 108 or delete existing custom feature code 108 based on interactions received at the user interface 122. The editing canvas may be a separate window within the user interface 122. When the design of the digital publication application is complete, the application builder 116 may produce the digital publication application 120.

Figure 3:
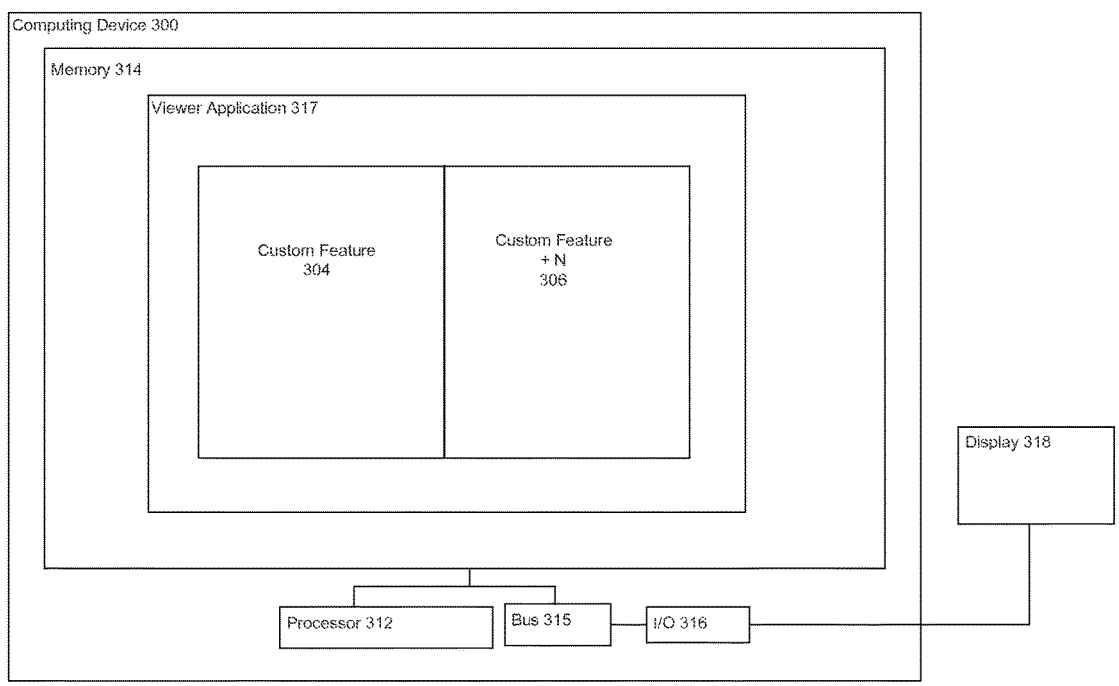
FIG. 3 is a block diagram depicting an exemplary computing system used to view a custom digital publication according to embodiments of this disclosure.

Referring now to FIG. 3, FIG. 3 is a block diagram depicting an exemplary computing system used to view a custom digital publication. In particular, FIG. 3 illustrates a digital publication application being viewed within a viewer application 317 on a computing device 300. The viewer application 317 is comprised in the memory 314 of the computing device 300. The viewer application 317 can include one or more software modules that provide an abstraction layer between the digital publication application and the operating system-level operations (e.g., memory allocation or disk access) of the computing device 300. The viewer application 317 can include one or more software modules that can configure the processor 312 to render the digital publication application for display at the display device 318. The viewer application 317 may be any software application suitable for viewing digital publication applications.

The computing device 300 may also comprise a number of external or internal devices such as input or output devices. For example, the computing device 300 is shown with an input/output ("I/O") interface 316 and a display 318. A bus 315 can also be included in the computing device 300 to communicatively couple one or more components of the computing device 300. Digital publication application, such as an application, executes or is otherwise used on the exemplary computing device 300. As is known to one of skill in the art, such digital publication application may be resident in any suitable computer-readable medium and execute on any suitable processor. In one embodiment, digital publication application can reside in memory 314 at the computing device 300. In another embodiment, digital publication application can be accessed by the computing device 300 from a remote location via a network.

A local copy of digital publication application executes or is otherwise used on the exemplary computing device 300. The digital publication application can include one or more custom features 304, 306. The one or more custom features 304, 306 may have been added to the digital publication application during the design of the digital publication application.

Figure 4:
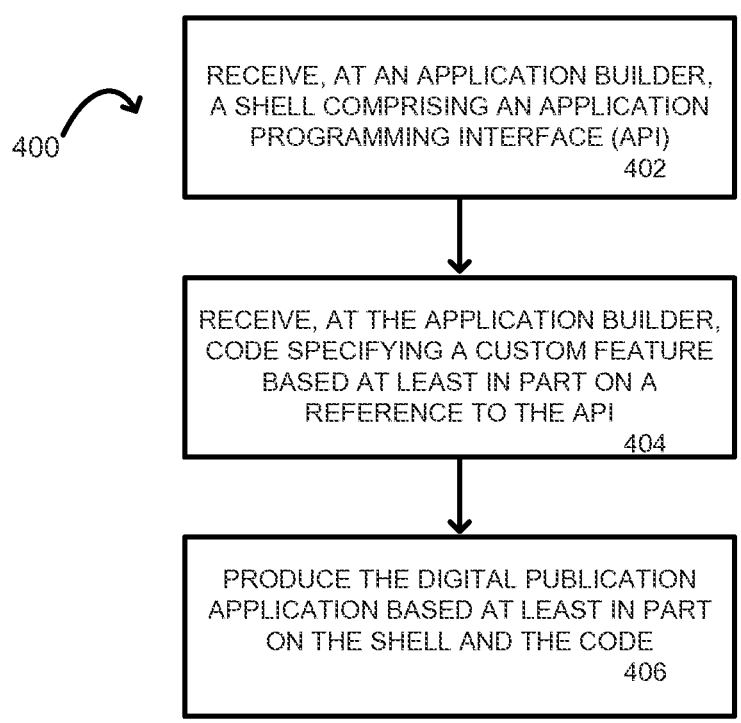
FIG. 4 is a flow chart illustrating an exemplary method for creating custom digital publications according to embodiments of this disclosure.

Referring now to FIG. 4, FIG. 4 shows a method 400 according to one embodiment of this disclosure. The method 400 of FIG. 4 will be described with respect to the system 100 shown in FIG. 1, but is not restricted to use only on the system 100 of FIG. 1. Other systems according to this disclosure are also suitable for performing the method 400 of FIG. 4. The method 400 described in FIG. 4 is embodied within a software application written in program code configured to be executed by a processor.

The method begins in block 402 where a digital publication application shell is received at an application builder. The digital publication application shell comprises an API. The digital publication application shell also comprises standard code. The digital publication application shell specifies standard functionality and appearance features for a digital publication application. In some embodiments, the standard code defines the standard functionality and appearance features for the digital publication application. The digital publication application shell may be configured to facilitate the addition of custom features, for example, specified via supplemental code external to the application shell.

At block 404, custom feature code is received by the application builder. The custom feature code may specify a custom feature for the digital publication application. The custom feature code may specify a custom feature based at least in part on a reference to the API of the digital publication shell. The custom feature code may comprise JavaScript API references, JavaScript and HTML. An application publisher, developer or third party may provide the custom feature code to the application builder. The custom feature code may be inserted or embedded into or otherwise used with the digital publication application shell via the application builder. The JavaScript API may include an API command that references an API feature of the digital publication shell. The application builder may interpret the API command to create a feature included in the ultimately produced digital publication application.

In some embodiments, user input may be received by the application builder to specify the inclusion of and/or attributes of a custom feature in the design of the digital publication application. The user of the application builder may input a selection to include the custom feature in the design of the digital publication application. For example, the user of the application builder may press a button on a user interface of the application builder during editing of the digital publication application that causes the custom feature to be added to the design of the digital publication application. User input may additionally or alternatively specify one or more attributes of the custom feature. The attribute may be variables that specify how the custom feature appears, functions, or otherwise is used in the design.

At block 406, the digital publication application is produced. The digital publication application may be based at least in part on the digital publication application shell and the custom feature code. The digital publication may be produced by the application builder. The digital publication application may comprise at least some of the standard functionality or appearance features specified by the digital publication application shell and the custom feature specified by the custom feature code.

The generated digital publication application may be used as a digital application that can be used on computing devices. For example, the generated digital publication application may be an application that can be run on different computing platforms and operating systems. The generated customized digital publication application may include a customized digital publication library. The generated customized digital publication may include any portion of the digital publication application being customized.

In some embodiments, additional custom features may be added to the digital publication application. The application builder may receive additional custom feature code that specifies one or more additional custom features for the digital publication application. The application builder may generate the digital publication application based at least in part on the digital publication application shell, the custom feature code and the additional custom feature code. The digital publication application generated by the application builder may comprise at least some of the standard functionality and appearance features specified by the digital publication application shell, the custom feature specified by the custom feature code, and the one or more additional custom features specified by the additional custom feature code.

Figure 5:
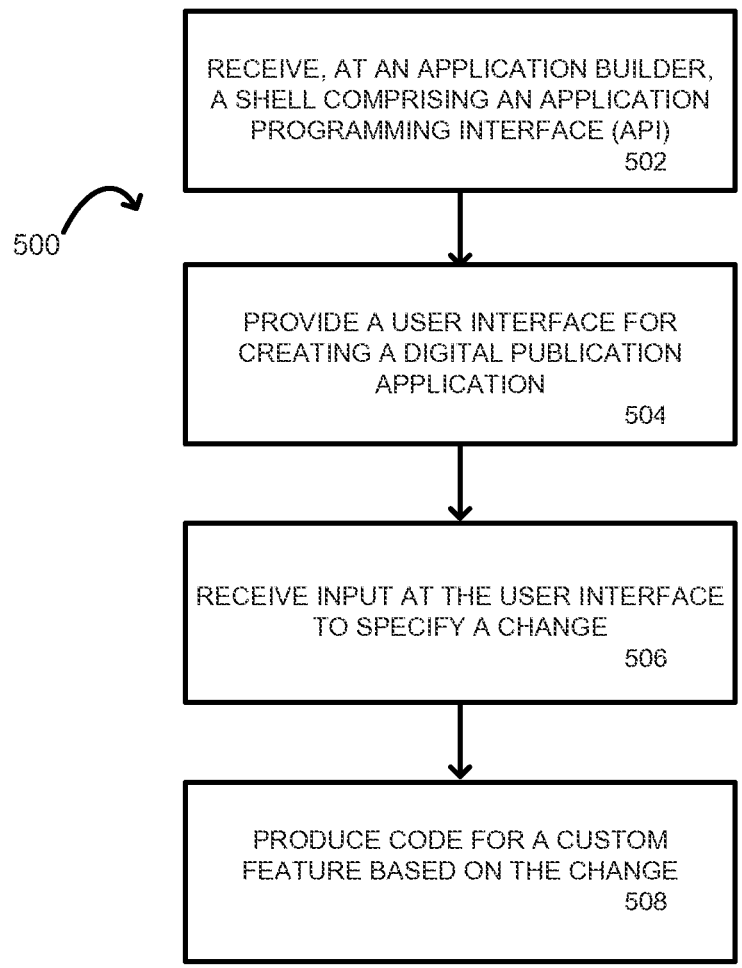
FIG. 5 is a flow chart illustrating an exemplary method for creating code for a custom feature of a digital publication application according to embodiments of this disclosure.

Referring now to FIG. 5, FIG. 5 shows a method 500 according to one embodiment of this disclosure. The method 500 of FIG. 5 will be described with respect to the system 100 shown in FIG. 1, but is not restricted to use only on the system 100 of FIG. 1. Other systems according to this disclosure are also suitable for performing the method 500 of FIG. 5. The method 500 described in FIG. 5 is embodied within a software application written in program code configured to be executed by a processor.

The method begins in block 502 where a digital publication application shell is received at an application builder. The digital publication application shell comprises an API. The digital publication application shell also comprises standard code.

At block 504, a user interface for creating a digital publication application is provided. The user interface may be an interface of the application builder. The interface may be used for the creation, modification and editing of digital application publications. The interface may be an editing interface for a user to create a text document specifying the custom feature code in declarative statement and/or script. The interface may be used to receive a graphical design, layout, and/or parameter settings that are used to produce such declarative statement and/or script defining a graphical design, layout, and/or parameter settings.

At block 506, input at the user interface specifying a change is received. The user of application builder may use the interface to specify a change. The specified change may be a change to include, modify, delete, or specify an attribute of a graphic or function in a digital publication application that is being modified. For example, the input received at the application builder may specify that a custom feature is to be included in the digital publication application at a particular location on the digital publication application start screen or while the digital publication application is in a particular state.

At block 508, code is produced for a custom feature based on the change. The application builder may generate or otherwise produce the code for a custom feature. The application builder may interpret the requested feature change and based on the interpretation create the code for the custom feature code. In an embodiment, the user of the application builder may select a button and, based on the selection, the application builder may generate code that specifies the requested custom feature. The generated code may comprise a reference to functionality provided by a digital publication application shell so that the generated code can be used with the digital publication application shell to produce a digital publication application. The generated custom code may comprise, for example, an API call to a function exposed by an API of the digital publication application shell that allows the custom code defined graphics and functions to function seamlessly with standard graphics and functionality defined by the digital publication application shell.

General

While the methods and systems herein are described in terms of software executing on various machines, the methods and systems may also be implemented as specifically-configured hardware, such as a field-programmable gate array (FPGA), specifically to execute the various methods. For example, embodiments of the methods and systems herein can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable medium may comprise, but are not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
    providing a user interface at an application builder, the application builder being executed by a processor, the user interface displaying a digital publication application shell and an editing canvas, wherein:
        the application builder produces a digital publication application based on the digital publication application shell,
        the digital publication application shell specifies standard functionality or appearance features for the digital publication application,
        the digital publication application shell includes an application programming interface (API) that exposes functions for custom features that can be added or modified, and
        the editing canvas includes user interface elements for adding or modifying the custom features via the API of the digital publication application shell;
    receiving selections via the user interface elements specifying one or more custom features for inclusion or modification in the digital publication application shell, the one or more custom features corresponding to custom feature code comprising one or more function calls that reference the functions exposed by the API;
    producing the digital publication application based at least in part on the digital publication application shell and the custom feature code by embedding the custom feature code within code from the digital publication application shell, wherein the digital publication application comprises at least some of the standard functionality or appearance features specified by the digital publication application shell and the one or more custom features specified by the custom feature code.

2. The method of claim 1 wherein custom feature code comprises an API command that communicates with the API of the digital publication application shell, wherein the application builder interprets the API command to create the custom feature included in the produced digital publication application.

3. The method of claim 1 wherein custom feature code comprises an API command that communicates with the API of the digital publication application shell, wherein the application builder interprets the API command to set or retrieve an application state.

4. The method of claim 1 wherein custom feature code comprises an API command that communicates with the API of the digital publication application shell, wherein the application builder interprets the API command to control the starting or use of an application process.

5. The method of claim 1 wherein custom feature code comprises an API command that communicates with the API of the digital publication application shell, wherein the application builder interprets the API command to respond to a change that originates within native code of the digital publication application shell.

6. The method of claim 1 wherein the custom feature code exposes a feature set for use by the application builder in editing the digital publication application.

7. The method of claim 1 wherein the custom feature code exposes a feature set for use by the application builder in editing the digital publication application, wherein the application builder provides a user interface for editing the digital publication application with one or more features of the feature set.

8. The method of claim 1 wherein the custom feature code exposes the custom feature for use by the application builder in editing the digital publication application, wherein input received at the application builder specifies inclusion of the custom feature in the digital publication application.

9. The method of claim 1 wherein the custom feature code exposes the custom feature for use by the application builder in editing the digital publication application, wherein input received at the application builder specifies an attribute of the custom feature in the digital publication application.

10. The method of claim 1 wherein the custom feature code exposes the custom feature for use by the application builder in editing the digital publication application, wherein the application builder provides a user interface comprising a selectable icon or button for including the custom feature in the digital publication application.

11. The method of claim 1 wherein the custom feature code comprises Hyper-Text Markup Language (HTML) code.

12. The method of claim 1 further comprising:
    receiving, at the application builder, additional custom feature code specifying one or more additional custom features for the digital publication application; and
    generating the digital publication application based at least in part on the digital publication application shell, the custom feature code and the additional custom feature code, wherein the digital publication application comprises at least some of the standard functionality and appearance features specified by the digital publication application shell, the custom feature specified by the custom feature code, and the one or more additional custom features specified by the additional custom feature code.

13. The method of claim 1 wherein the digital publication application is a library providing an interface for accessing items of electronic content.

14. The method of claim 1 wherein the custom feature code has a first format, the digital publication application has a second format different from the first format, and wherein the digital publication application is configured for use in an environment in which the first format is not operable.

15. The method of claim 1, wherein the custom feature code corresponding to the one or more custom features is automatically revised to reflect received changes to the user interface elements on the editing canvas.

16. The method of claim 1, wherein the API of the digital publication application shell is a native API, and wherein the custom feature code is script code configured to reference the native API.

17. A non-transitory computer-readable medium on which is encoded program code, the program code comprising:
    program code for providing a user interface at an application builder, the user interface displaying a digital publication application shell and an editing canvas, wherein:

the application builder produces a digital publication application based at least in part on the digital publication application shell, the digital publication application shell specifies standard functionality or appearance features for the digital publication application, the digital publication application shell includes an application programming interface (API) that exposes functions for custom features that can be added or modified, and the editing canvas includes user interface elements for adding or modifying the custom features exposed by the API of the digital publication application shell;

program code for receiving selections via the user interface elements specifying one or more custom features for inclusion or modification in the digital publication application shell, the one or more custom features corresponding to custom feature code comprising one or more function calls that reference the functions exposed by the API; and program code for producing the digital publication application based at least in part on the digital publication application shell and the custom feature code by embedding the custom feature code within code from the digital publication application shell, wherein the digital publication application comprises at least some of the standard functionality or appearance features specified by the digital publication application shell and the one or more custom features specified by the custom feature code.

18. The non-transitory computer-readable medium of claim 17 wherein custom feature code comprises an API command that communicates with the API of the digital publication application shell, wherein the application builder interprets the API command to create the custom feature included in the produced digital publication application.

19. The non-transitory computer-readable medium of claim 17 wherein custom feature code comprises an API command that communicates with the API of the digital publication application shell, wherein the application builder interprets the API command to set or retrieve an application state.

20. A system comprising:

a computer-readable medium; and a processing device communicatively coupled to the computer-readable medium, wherein the processing device is configured to execute instructions included in the computer-readable medium to perform operations comprising:

providing a user interface at an application builder, the user interface displaying a digital publication application shell and an editing canvas, wherein:

the application builder produces a digital publication application based at least in part on the digital publication application shell, the digital publication application shell specifies standard functionality or appearance features for the digital publication application, the digital publication application shell includes an application programming interface (API) that exposes functions for custom features that can be added or modified to the digital publication application, and the editing canvas includes user interface elements for adding or modifying the custom features exposed by the API of the digital publication application shell;

receiving selections via the user interface elements specifying one or more custom features for inclusion or modification in the digital publication application shell, the one or more custom features corresponding to custom feature code comprising one or more function calls that reference the functions exposed by the API;

producing the digital publication application based at least in part on the digital publication application shell and the custom feature code by embedding the custom feature code within code from the digital publication application shell, wherein the digital publication application comprises at least some of the standard functionality or appearance features specified by the digital publication application shell and the one or more custom feature specified by the custom feature code.

* * * * *